(12) United States Patent
Xiao et al.

(10) Patent No.: US 12,242,634 B2
(45) Date of Patent: Mar. 4, 2025

(54) HIGHLY FLEXIBLE, SCALABLE MULTI BLOCKCHAIN, HIERARCHICAL DATA SHARING AND DATA STORING SYSTEM AND METHOD THEREOF

(71) Applicant: Huazhong University of Science and Technology, Wuhan (CN)

(72) Inventors: Jiang Xiao, Wuhan (CN); Jian Chang, Wuhan (CN); Junpei Ni, Wuhan (CN); Xiaohai Dai, Wuhan (CN); Shijie Zhang, Wuhan (CN); Hai Jin, Wuhan (CN)

( * ) Notice: Subject to any disclaimer, the term of this patent is extended or adjusted under 35 U.S.C. 154(b) by 241 days.

(21) Appl. No.: 17/664,760

(22) Filed: May 24, 2022

(65) Prior Publication Data

US 2023/0016241 A1    Jan. 19, 2023

(30) Foreign Application Priority Data

Jul. 13, 2021 (CN) .......................... 202110794129.4

(51) Int. Cl.
*G06F 21/62* (2013.01)
*G06F 16/22* (2019.01)
*G06F 21/60* (2013.01)

(52) U.S. Cl.
CPC ...... *G06F 21/6227* (2013.01); *G06F 16/2246* (2019.01); *G06F 21/602* (2013.01)

(58) Field of Classification Search
CPC . G06F 21/602; G06F 21/6227; G06F 16/2246
See application file for complete search history.

(56) References Cited

U.S. PATENT DOCUMENTS 10,146,792 B1 * 12/2018 Dobrek ............... H04L 9/32
2018/0181768 A1 * 6/2018 Leporini ............. H04L 63/08
(Continued)

OTHER PUBLICATIONS

Kan, Luo, et al. "A multiple blockchains architecture on inter-blockchain communication." 2018 IEEE international conference on software quality, reliability and security companion (QRS-C). IEEE, 2018. (Year: 2018).*

(Continued)

*Primary Examiner* — Syed A Zaidi
(74) *Attorney, Agent, or Firm* — Michael Ye; Kalos Athena Wang PLLC

(57) ABSTRACT

The present invention relates to a highly flexible, scalable multi-blockchain, hierarchical data-sharing and data-storing system, at least comprising a third-party blockchain system, a data-sharing blockchain system, and an application-layer client, wherein the data-sharing blockchain system performs data aggregation and hierarchical storage on shared data uploaded by the third-party blockchain system through accessing the data-sharing blockchain system, so as to allow the application-layer client to require the shared data from the data-sharing blockchain system. The disclosure herein creates a single reliable data-sharing blockchain apparatus based on blockchain systems, so as to facilitate aggregation of data coming from different blockchain systems, reduce node complexity and block data redundancy when data are acquired from multiple parties, and define different sharing rules for different data contents, thereby being adaptive to scenarios where data are shared among parties.

1 Claim, 2 Drawing Sheets

(56) References Cited

U.S. PATENT DOCUMENTS

| | | | | |
|---|---|---|---|---|
| 2020/0050591 A1* | 2/2020 | Dobrek | ............... | G06Q 20/405 |
| 2020/0334229 A1* | 10/2020 | Harrison | ................ | A61G 7/05 |
| 2021/0326815 A1* | 10/2021 | Brody | ................ | H04L 9/3239 |
| 2022/0021708 A1* | 1/2022 | Smith | ................ | H04L 63/06 |
| 2022/0035936 A1* | 2/2022 | Lin | ................ | H04L 9/0825 |
| 2022/0383417 A1* | 12/2022 | Cummings | ............ | G06Q 40/06 |
| 2023/0004423 A1* | 1/2023 | Fatahi | ................ | G06F 21/64 |
| 2023/0205929 A1* | 6/2023 | Nation | ................ | H04L 9/0643 726/27 |

OTHER PUBLICATIONS

Wang, Shangping, Yinglong Zhang, and Yaling Zhang. "A blockchain-based framework for data sharing with fine-grained access control in decentralized storage systems." Ieee Access 6 (2018): 38437-38450. (Year: 2018).*

NPL Search Terms (Year: 2024).*

* cited by examiner

HIGHLY FLEXIBLE, SCALABLE MULTI BLOCKCHAIN, HIERARCHICAL DATA SHARING AND DATA STORING SYSTEM AND METHOD THEREOF

This application claims the benefit of the Chinese Patent Applications No. CN 202110794129.4 filed on Jul. 13, 2021, which is hereby incorporated by reference as if fully set forth herein.

BACKGROUND OF THE INVENTION

1. Technical Field

The present invention relates to blockchain technology, and more particularly to a highly flexible, scalable multi-blockchain, hierarchical data-sharing and data-storing system and method thereof.

2. Description of Related Art

As digital currencies such as Bitcoin have become a big hit, blockchain as the underlying technology of cryptocurrency is attracting increasing attention. The blockchain technology provides a new distributed infrastructure that stores and validates data chronologically using block-chain type data structures; confirms and updates data using distributed consensus algorithms; programs and operates data using smart contracts; and protects data security using cryptology. Being distinctive for having a decentralized structure, unique representative digital value, high security, and tamper-resistance, blockchains have been recognized as a trust machine that may solve trust problems through technical means, and thus regarded as having unique advantages in terms of digital information sharing.

In the conventional, centralized data storage architecture, mistrust among datacenters and potential network insecurity make data distribution and sharing challenging and limit data value. By comparison, the blockchain technology provides unique advantages in terms of data sharing. On one hand, in a blockchain system, every participating node keeps a validatable system data copy. On the other hand, the cryptological properties of blockchains may help address security concerns in the process of data sharing. Therefore, many studies have been made with respect to blockchain-based data sharing methods specific to different application scenarios, such as the Internet of Things, the Internet of Vehicles, Smart Healthcare, etc. However, many blockchain systems may coexist in the same application scenario. Without a normalized set of standards, these blockchain systems can be heterogeneous, and data distribution among them is therefore difficult. Hence, data sharing among blockchain systems is still an issue to be addressed.

As an example of the known solutions of data sharing, China Patent Application Publication No. CN111723154B discloses a blockchain-based medical data sharing system. The known system includes an account application module for receiving application information from a smart terminal and correspondingly generating an account number and a password; and a medical data acquiring module for collecting medical data by means of an aggregation node and plural sensor nodes that collect medical data. The medical data of patients so collected are stored in corresponding storage nodes along a blockchain. Additionally, access right allocation is defined according to application information from smart terminals, so as to control access rights on the storage nodes along the blockchain. Therein, an interaction module may be used to receive identification information input by a smart terminal and retrieve corresponding medical data from the blockchain. The known system realizes smart collection of medical data, and provides functions such as retrieval of medical records of patients and access control for sensitive medical data, thereby effectively promoting data distribution and sharing of medical big data.

Another prior-art solution is as disclosed in China Patent Application Publication No. CN108989357B, which provides a blockchain-based data sharing method based on user authorization and access control. In the method, different security attributes are assigned to identities defined by users in a system, and user rights are generated and stored in a blockchain. Furthermore, different security marks are generated for data objects according to security levels of the data objects in the system, and security attribute marks of the data objects are stored in the blockchain. In this system, various users have different access rights on different data objects, so that an access control rule list corresponding to the user identities and the data security attributes can be generated and stored in a smart contract. If a user is trying to access data, his/her user right and the security attribute mark of the data to be accessed firstly will be acquired from the chain. The system determines whether the access right is established according to the access control rules stored in the smart contract. If yes, the user is permitted to access the data object; otherwise, the user is rejected from accessing the data object. This known approach realizes sharing and access control of data having different security attributes corresponding to different user rights with a single blockchain system, in which all nodes jointly maintain the same blockchain data ledger.

However, the existing blockchain-based schemes for achieving data sharing and access control are designed for single-blockchain applications and unable to support data sharing and privacy protection among multiple blockchains. Hence, it is quite important to develop a scalable multi-blockchain data sharing system that supports data distribution in multi-blockchain environments and thereby making full use of the potential value of data.

Further, since there is certainly discrepancy between the prior art comprehended by the applicant of this patent application and that known by the patent examiners and since there are many details and disclosures disclosed in literatures and patent documents that have been referred by the applicant during creation of the present invention not exhaustively recited here, it is to be noted that the present invention shall actually include technical features of all of these prior-art works, and the applicant reserves the right to supplement the application with technical features known in the art as support.

SUMMARY OF THE INVENTION

To overcome problems of data sharing in multi-blockchain scenarios, the present invention provides a highly flexible, scalable multi-blockchain, hierarchical data-sharing and data-storing system and a method thereof. The objective of the present invention is to create a single reliable data sharing blockchain apparatus and its method based on blockchain systems, so as to facilitate aggregation of data coming from different blockchain systems, reduce node complexity and block data redundancy when data are acquired from multiple parties, and define different sharing rules for different data contents, thereby being adaptive to scenarios where data are shared among parties.

To achieve the aforementioned objectives, the present invention discloses a highly flexible, scalable multi-blockchain, hierarchical data-sharing and data-storing system, at least comprising a third-party blockchain system, a data-sharing blockchain system, and an application-layer client, wherein the data-sharing blockchain system performs data aggregation and hierarchical storage on shared data uploaded by the third-party blockchain system through accessing the data-sharing blockchain system, so as to allow the application-layer client to require the shared data from the data-sharing blockchain system.

The disclosure realizes multi-blockchain heterogeneous data sharing by providing a novel three-layer blockchain data sharing framework or system. The system is capable of accomplishing uniform data abstraction among blockchain systems for different applications through a smart contract layer. The contract layer is separately extracted from the blockchain systems. Thereby, the disclosure is different from the traditional two-layer architecture composed of an application layer and a blockchain layer. On the basis of the two-layer architecture, the present invention has made further subdivision and expansion to develop a three-layer architecture that is composed of an application layer, a smart contract layer, and a storage layer. Therein, the smart contract layer and the blockchain system are logically separated from each other. By designing the interface of the contract layer and developing the contract, the present invention provides an independent data module acting as a window for data sharing without largely modifying heterogeneous original data from multiple blockchains.

The disclosed multi-blockchain, hierarchical data-sharing and data-storing system supports addition of heterogeneous sub-systems. Besides, the heterogeneous sub-systems can be added without taking care of details of their respective implementations. Existing participants and new participants of the system in different applications can easily complete data sharing by simply deploying the contract layer. With the application layer and the contract layer, access to shared data in the data layer can be controlled conveniently. To isolate operation of data sharing from the data requiring party and data holding party, a shared-data storing layer is provided as an independent module for aggregating the shared data and processing data requests. The shared-data storing layer normalize data from heterogeneous blockchains. On this basis, the data requiring party can request and validate data through the data request interface of the application layer and the light-weight client validator, without difficulty in requiring data caused by system heterogeneity.

According to a preferred embodiment, the data-sharing blockchain system is deployed with smart contracts that aggregate the shared data in the third-party blockchain system and store the aggregated shared data into the data-sharing blockchain system.

According to a preferred embodiment, the data-sharing blockchain system is deployed with a first contract serving to process an access request, and uses the first contract to process the access request from the third-party blockchain system.

According to a preferred embodiment, the data-sharing blockchain system is deployed with a second contract serving to process data submission, and uses the second contract to process the shared data submitted by the third-party blockchain system.

According to a preferred embodiment, the third-party blockchain system is deployed with a third contract serving to submit the access request, and uses the third contract to establish connection with the data-sharing blockchain system.

According to a preferred embodiment, the third-party blockchain system is deployed with a fourth contract serving to upload the shared data, and uses the fourth contract to send the shared data to the data-sharing blockchain system.

The disclosure herein further provides a highly flexible, scalable multi-blockchain, hierarchical data-sharing and data-storing method, at least comprising: uploading shared data to a data-sharing blockchain system by a third-party blockchain system, and performed data aggregation and hierarchical storage through the data-sharing blockchain system, after the third-party blockchain system has accessed the data-sharing blockchain system, so as to allow the application-layer client to require the shared data from the data-sharing blockchain system.

Firstly, the third-party blockchain system accesses the data-sharing blockchain system. Secondly, the third-party blockchain system uploads the shared data to the data-sharing blockchain system. Then the data-sharing blockchain system performs data aggregation and hierarchical storage on the shared data. Finally, the application-layer client can require the shared data from the data-sharing blockchain system.

According to a preferred embodiment, the method further comprises at least one of the following steps: deploying a first contract in the data-sharing blockchain system for processing access requests from third-party blockchain systems; deploying a second contract in the data-sharing blockchain system for processing shared data submitted by third-party blockchain systems; deploying a third contract in the data-sharing blockchain system for submitting access requests so as to establish connection between the third-party blockchain systems and the data-sharing blockchain system; and deploying a fourth contract in the third-party blockchain systems for uploading shared data, so that the third-party blockchain system can send the shared data to the data-sharing blockchain system.

According to a preferred embodiment, with the smart contracts deployed in the data-sharing blockchain system, shared data provided by third-party blockchain systems can be aggregated and stored in the data-sharing blockchain system.

According to a preferred embodiment, when the data-sharing blockchain system receives an access request initiated by a third-party blockchain system according to the access protocol, the first contract is triggered, and the data-sharing blockchain system records access information.

According to a preferred embodiment, the access request, after received by nodes in the data-sharing blockchain system, is broadcasted to other nodes in the data-sharing blockchain system in the form of messages.

According to a preferred embodiment, the data-sharing blockchain system calls the first contract to analyze the access request and then can obtain the definitions of the sharing and storing hierarchy of the third-party blockchain system.

According to a preferred embodiment, the shared data are sent to the data-sharing blockchain system by third-party blockchain systems according to the uploading protocol deployed therein, and stored in the storage node of the data-sharing blockchain system.

According to a preferred embodiment, the shared data are analyzed and validated by the data-sharing blockchain system using the second contract, and then stored into the storage node of the data-sharing blockchain system.

According to a preferred embodiment, after receiving the access request, the data-sharing blockchain system performs consensus validation on it. If the access request passes consensus validation, the data-sharing blockchain system calls a fifth contract to perform hierarchical storage on the shared data according to the sharing and storing hierarchy.

The disclosure further provides a data sharing method based on blockchain smart contracts, at least comprising: having the third-party blockchain system, when accessing the data-sharing blockchain system, preset data sharing rules in the data-sharing blockchain system; assigning, while shared data are uploaded, corresponding sharing rules to every entry of the shared data; and having the data-sharing blockchain system perform data storage and/or data access control according to the data sharing rules.

The disclosure further provides a highly flexible, scalable multi-blockchain, hierarchical data-sharing and data-storing system, at least comprising: a data-sharing blockchain system, deployed with a first contract for processing an access request and a second contract for processing data submission; and a third-party blockchain system, deployed with a third contract for submitting an access request and a fourth contract for uploading shared data. Therein, based on a smart protocol, shared data uploaded to the data-sharing blockchain system by the third-party blockchain system after having connection with the data-sharing blockchain system can be stored and/or shared in a hierarchical manner.

The disclosure further provides a highly flexible, scalable multi-blockchain, hierarchical data-sharing and data-storing apparatus, which can be used in the multi-blockchain, hierarchical data-sharing and data-storing system of the present invention. The apparatus at least comprises: a contract management module used to at least deploy, manage, or call contracts; a data management module used to at least process requests for and validation of shared data; and a data storage module used to accomplish aggregation and storage of the shared data. The multi-blockchain, hierarchical data-sharing and data-storing apparatus applicable to the blockchain systems herein at least includes at least one of the followings: the contract management module, the data management module, and the data storage module. Preferably, the multi-blockchain, hierarchical data-sharing and data-storing apparatus of the present invention can be, for example, a computer, a server, as well as other devices or systems adopting the multi-blockchain, hierarchical data-sharing and data-storing apparatus. According to an embodiment of the present invention, besides the contract management module, the data management module, and the data storage module, the multi-blockchain, hierarchical data-sharing and data-storing apparatus may further include other components such as a central processing unit, a communication unit, a storage unit, and an I/O unit. The contract management module, the data management module, and the data storage module are connected with the central processing unit, respectively, and all perform information exchange with it.

For example, general-purpose processors, digital signal processors (DSPs), application specific integrated circuits (ASICs), field programmable gate arrays (FPGAs) or other programmable logic devices, discrete gate or transistor logic, discrete hardware components or any combination thereof for performing the functions described herein can be used to implement or execute the various exemplary logical blocks, modules, and circuits described according to the present disclosure. A general-purpose processor may be a microprocessor, or, alternatively, any common processor, controller, microcontroller, or state machine. A processor may also be implemented as a combination of computing devices, e.g., a combination of a DSP and a microprocessor, a combination of multiple microprocessors, a combination of one or more microprocessors and a DSP core, or any other such configuration. Exemplarily, embodiments of the present disclosure may be described in the context of machine-executable instructions, such as those included in program modules executed by the components on a real or virtual target processor. Generally, program modules include routines, programs, libraries, objects, classes, components, data structures, etc., that perform particular tasks or implement particular abstract data structures. In various embodiments, the functionality of the program modules can be combined or divided among them. Machine-executable instructions for program modules may be executed within local or distributed devices. In the latter case, program modules can be located both in local and remote storage medium.

According to a first aspect of the present invention, a scalable data aggregation method based on blockchain smart contracts is provided. The data-sharing blockchain system is deployed with a first contract for processing access requests. The first contract is used to process access requests from third-party blockchain systems. The data-sharing blockchain system is deployed with a second contract for processing data submission. The second contract is used to process shared data submitted by third-party blockchain systems. Every third-party blockchain system is deployed with a third contract for submitting access requests. The third contract is used to establish connection between the third-party blockchain system and the data-sharing blockchain system. Every third-party blockchain system is deployed with a fourth contract for uploading shared data. The fourth contract is used by the third-party blockchain system to send shared data to the data-sharing blockchain system.

According to a preferred embodiment, the data-sharing blockchain system does not produce data itself. Instead, it only uses the deployed smart contracts to perform aggregation and storage on the data shared by systems of the participating parties.

According to a preferred embodiment, for a third-party blockchain system to participate in data sharing, the first thing it has to do is to establish connection with the data-sharing blockchain system. The third-party blockchain system, after reaching consensus within itself through deployment of the third contract, initiates an access request to the data-sharing blockchain system. The data-sharing blockchain system after receiving the access request triggers the first contract, records access information, performs processing, and finally returning an operation result.

According to a preferred embodiment, after connecting the data-sharing blockchain system, the third-party blockchain system may send the shared data in itself to the data-sharing blockchain system through the deployed fourth contract according to custom rules. The data-sharing blockchain system uses the second contract to analyze and validate the data, and then stores the data in its storage node. Upon completion of processing, the data-sharing blockchain system returns the operation result.

To achieve the foregoing objective, in a second aspect, the present invention provides a hierarchical storage and sharing method for shared data based on a blockchain smart contract. The third-party blockchain system after accessing the data-sharing blockchain system can preset how the data in the data-sharing blockchain system should be shared, and can subsequently assign how the data should be shared for every entry of the data during the process where the data are uploaded. The data-sharing blockchain system will store the data and perform access control for the data accordingly. The data-sharing blockchain system is deployed with a fifth contract for storage of the shared data. The fifth contract is used to define the data storing and sharing hierarchy in the data-sharing blockchain system. The data that have been processed according to the second contract are stored corresponding to the data storing and sharing hierarchy obtained by analyzing. The data-sharing blockchain system is deployed with a sixth contract for access control in the process of data sharing. The sixth contract is used to retrieve data in response to a client request that requires the shared data, and performs access control according to the data storing and sharing hierarchy. The third-party blockchain system will assign classes of data for itself with the third contract, and assign a level of the data storing and sharing hierarchy for each class of data. When the fourth contract is triggered, the third-party blockchain system packages the shared data and assign a data class label for the shared data.

Although the hierarchical storage and sharing method for shared data in specific embodiments of the present invention are depicted in a particular order, this should not be construed as requiring that such operations be performed in the particular order as shown or in a sequential order, or that all illustrated operations must be performed to achieve the desired result. In some cases, multitask or parallel processing may be beneficial. Likewise, although the above discussion contains some specific implementation details, these should not be construed as limits to the scope of invention or claims, but rather as descriptions about specific embodiments of specific inventions. Certain features in the aforesaid description that are described in different embodiments can also be implemented integrally in one single embodiment. Conversely, various features from each embodiment can also be implemented separately in multiple embodiments or in any suitable combination thereof.

According to a preferred embodiment, the data-sharing blockchain system defines the data storing and sharing hierarchy for itself by setting the fifth contract. The sixth contract will perform access control on every data-sharing request according to the data storing and sharing hierarchy.

According to a preferred embodiment, when accessing the data-sharing blockchain system, the third-party blockchain system uses the third contract to designate the data class labels of data inside the third-party blockchain system that are open to sharing, and assign the levels of the data storing and sharing hierarchy for different classes of data. When the data-sharing blockchain system receives an access request, the first contract will analyze the access request, and acquire the data class label and the level of the data storing and sharing hierarchy assigned by the third-party blockchain system.

According to a preferred embodiment, the third-party blockchain system uses the fourth contract to assign a data class label for every entry of the shared data. When the data-sharing blockchain system receives the data uploaded by the third-party blockchain, the second contract is triggered to analyze the data so as to acquire the original data and the corresponding data class label. Then the fifth contract is used to store the shared data according to the level of the data storing and sharing hierarchy assigned by the third-party blockchain system when accessing the data-sharing blockchain system.

In general, with the technical schemes provided by the present invention, at least one of the following beneficial effects can be achieved:

(1) The present invention gathers data of plural blockchain systems to a dedicated data sharing blockchain platform through data aggregation, so as to free a client that wants to access shared data from the trouble of requiring data from different blockchain systems separately, thereby reducing complexity of data-requiring operation and eliminating data storage redundancy for downloading copies of multiple blockchains; and (2) By setting the data storing and sharing hierarchy, the present invention gives abstract definition to data sharing behaviors in the system, and provides fine-grained access control for the data sharing process. The blockchain system providing shared data/third-party blockchain system may define the scope and way to share data before it accesses the data-sharing blockchain system, so that the blockchain system for providing shared data/third-party blockchain system does not directly interact with the data sharing process and thus can have full control over its data.

DETAILED DESCRIPTION OF THE INVENTION

Figure 1:
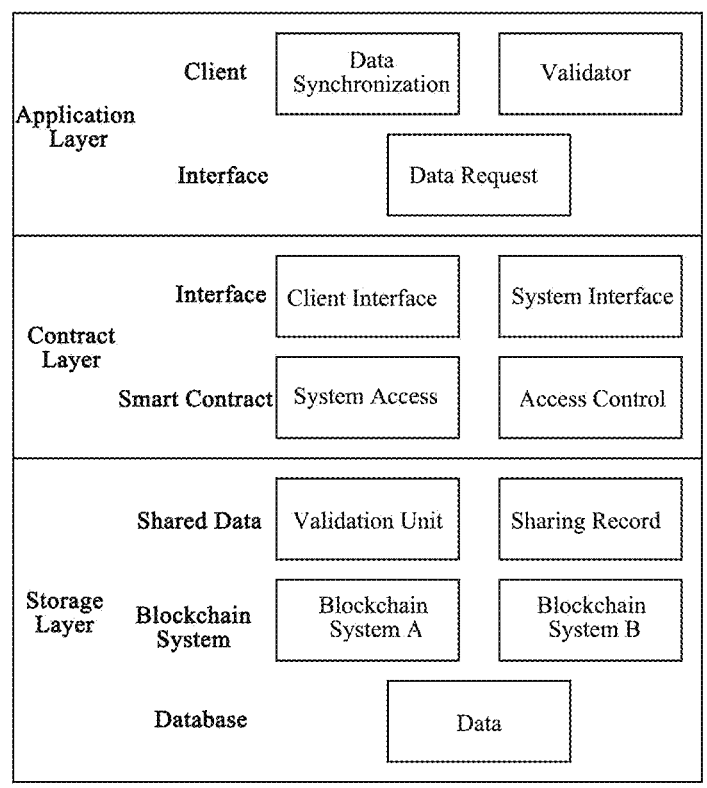
FIG. 1 is a schematic structural diagram of a multi-blockchain, hierarchical data-sharing and data-storing system as disclosed in the present invention.

In order to make the objectives, technical solutions and advantages of the present invention clearer, the present invention will be further described in detail below with reference to the accompanying drawings and embodiments. It should be understood that the specific embodiments described herein are only used to explain but not to limit the present invention. In addition, the technical features involved in the various embodiments of the present invention described below can be combined with each other, provided that there is no mutual conflict.

For ease of understanding, technical terms of the present invention are explained as follows.

Herein, the phrase "highly flexible, scalable" when used in connection with a system refers to a capability to enable data interaction between chains, or data sharing among plural blockchain systems. The existing blockchain systems have serious bottlenecks in terms of scalability. That is, data interaction between chains is difficult. Because of the lack of uniform standards in the blockchain technology and heterogeneity among different blockchain systems, data distribution among different blockchain systems can be complicated.

Herein, the term "multi-blockchain data" refers to data originating from different blockchain systems.

Herein, the term "hierarchical sharing and storing" refers to operation where shared data of different classes are shared or stored according to their respective levels of the storage and sharing hierarchy. The data storage and sharing hierarchy forms a basis for the data-sharing blockchain system to perform access control on data sharing requests.

Herein, the term "data aggregation" refers to a process of integrating data derived from different blockchain systems.

Herein, the term "node" also known as a "blockchain node," and usually refers to a computer in a blockchain network. Any computer connected to a blockchain network, such as a mobile phone or a mining machine, is node as defined herein.

Herein, the term "smart contract" refers to a computer protocol that facilitates propagation, validation, or enforcement of a contract in an informatized manner. Smart contracts enable reliable transactions to be performed without presence of a third party, and make these transactions traceable and irreversible. Smart contracts in the blockchain field have the following characteristics: having open and transparent rules, with rules and data in the contract visible to the exterior; making all transactions open and visible, without any possibility of fraud and hiding. The features of the blockchain technology like openness, transparency, and tamper-resistance are all endowed by smart contracts. Smart contracts are essentially programs, which realize automated processing of the traditional contract in the form of computer instructions. Briefly, a smart contract is a code that is triggered to be executed when two parties are doing a transaction for blockchain assets. This code is known as a smart contract. A blockchain-based smart contract includes mechanisms for processing and storing transactions, and also a complete state machine for receiving and processing various smart contracts. Transaction storage and state processing are both completed in a blockchain. A transaction mainly includes data to be sent, and an event is description information of these data. After the information of transactions and events is transmitted into a smart contract, the resource state in the contract resource set is updated, thereby triggering the smart contracts to perform determination on the state machine. If the triggering conditions for a certain or some certain actions in the automatic state machine are satisfied, the state machine choses and automatically perform the contract action(s) according to preset information. When the trigger conditions contained in event description information are satisfied, the smart contract system automatically sends preset data resources from the smart contracts and the events comprising the triggering conditions.

Consensus is a decision-making process, with the purpose to ensure that all participants can reach a consensus in terms of the current state after addition of a new data block. A consensus protocol ensures the accuracy of a chain, and provides incentives to participants that make contribution. The consensus mechanism refers to validation and confirmation of transactions in a very short period of time through voting of special nodes. To a transaction, if several irrelevant nodes reach consensus, it is appropriate to consider that the consensus is reached across the network. As a data structure where data are stored chronologically, blockchains support different consensus mechanisms. Consensus mechanisms are important components in the blockchain technology. The objective of the blockchain consensus mechanism is to make all honest nodes keep consistent blockchain views, and satisfy the following two qualities: consistency, which means that all honest nodes keep the exactly same prefix of blockchains; and effectiveness, which means that information published by some honest node will eventually be recorded by all the other honest nodes in their respective blockchains.

A Merkle tree is also known as a hash tree, which is a tree storing hash values. The leaves of a Merkle tree are hash values of data blocks (such as a document or a set of documents), and the non-leaf nodes are hashes corresponding to serial character strings of its sub-nodes. Hash is a function that maps data of any length to data of a fixed length.

Blockchains may be classified into single chains, side chains, and interchains by their docking types. Any blockchain system capable of running independently can be referred to as a "single chain," such as the main chain and a test chain for Bitcoin; the main chain and a test chain for Ethereum; the main chain and a test chain for Litecoin; and a Fabric-built consortium chain in a Hyperledger Project. These blockchain systems have complete component modules, making them self-supporting. Most blockchains are of the single chain structure, wherein information of the ledger, contracts, and transactions is stored in the same chain, and all nodes participating in computation vote in the chain to ensure consistency. The existing blockchain technology in the single-chain architecture has met its bottleneck in terms of privacy and scalability.

The first to sixth contracts may successively be a registration contract, an aggregation contract, an access contract, an uploading contract, a storage contract, and an access control contract.

As shown in FIG. 1, the highly flexible, scalable multi-blockchain, hierarchical data-sharing and data-storing system of the present invention in terms of system architecture comprises an application layer, a contract layer, and a storage layer. For better illustration, the data-sharing chain disclosed in the present invention will be referred to as the data-sharing chain for short.

The application layer includes entities that want to acquire shared data through the data-sharing chain in various application scenarios, such as service providers and individual clients. A developer may adopt a data request interface and deploy simple data synchronizer and validator for application programs, thereby enabling requests for and validation of the shared data.

The contract layer is the core of logic implementation of the system, and includes contracts that face the blockchain system providing shared data and face application clients, for realizing data aggregation and controllable distribution logic.

The storage layer is at the bottom of the system and forms a foundation for data storage. The blockchain system providing the shared data is also a part of the storage layer. The shared data are processed by the contract layer and stored in the node of the data-sharing chain according to the preset sharing and storing hierarchy.

To achieve highly flexible, scalable multi-blockchain data hierarchical storage, the disclosed data storage method at least comprising the following steps: making a third-party blockchain system access the data-sharing chain; and making the third-party blockchain system upload shared data to the data-sharing chain, and performing data aggregation and hierarchical storage. The application-layer client may require shared data from the data-sharing chain.

Figure 2:
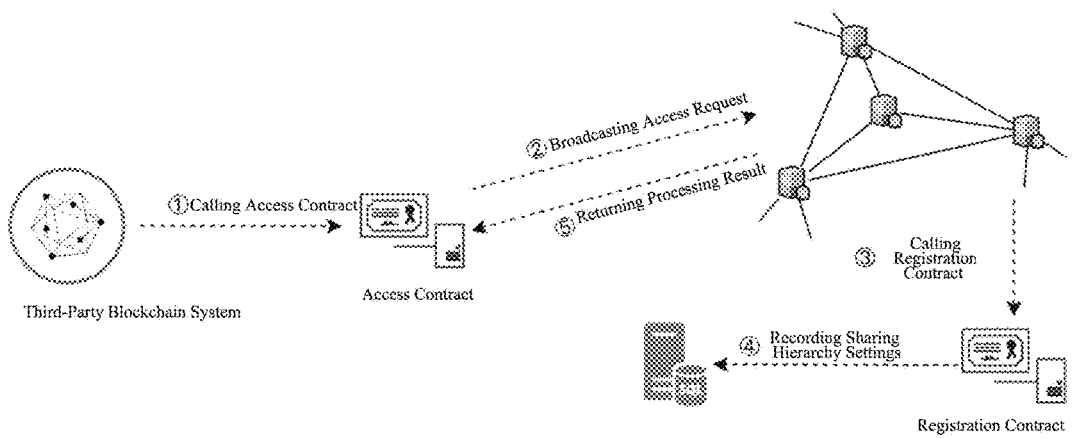
FIG. 2 is a schematic flowchart showing that a third-party blockchain system connects a data-sharing blockchain system as disclosed in the present invention.

Preferably, as shown in FIG. 2, the third-party blockchain system initiates an access request to the data-sharing chain.

The third-party blockchain system is deployed with a third contract for processing submission of access requests and thereby establishing connection with the data-sharing blockchain system. When accessing the data-sharing blockchain system, the third-party blockchain system assigns data class labels for its sharable data and the data storing and sharing hierarchy for data of different classes through the third contract. With the deployment of the third contract, or the access contract, after connecting the data-sharing blockchain system, the third-party blockchain system is able to realize synchronization of the shared data in the data-sharing blockchain system.

A node in the data-sharing chain receives the access request and broadcast this message to other nodes in the data-sharing chain. The data-sharing chain calls the first contract to analyze the access request. The data-sharing chain records the definition of the sharing and storing hierarchy of the third-party blockchain system obtained by analyzing the access request into a block. The data-sharing chain after recording the definition of the sharing and storing hierarchy into the block returns a processing result. With deployment of the first contract, or the registration contract, the third-party heterogeneous system can dynamically require to join or quit the system, making the sharing system flexible and scalable.

Figure 3:
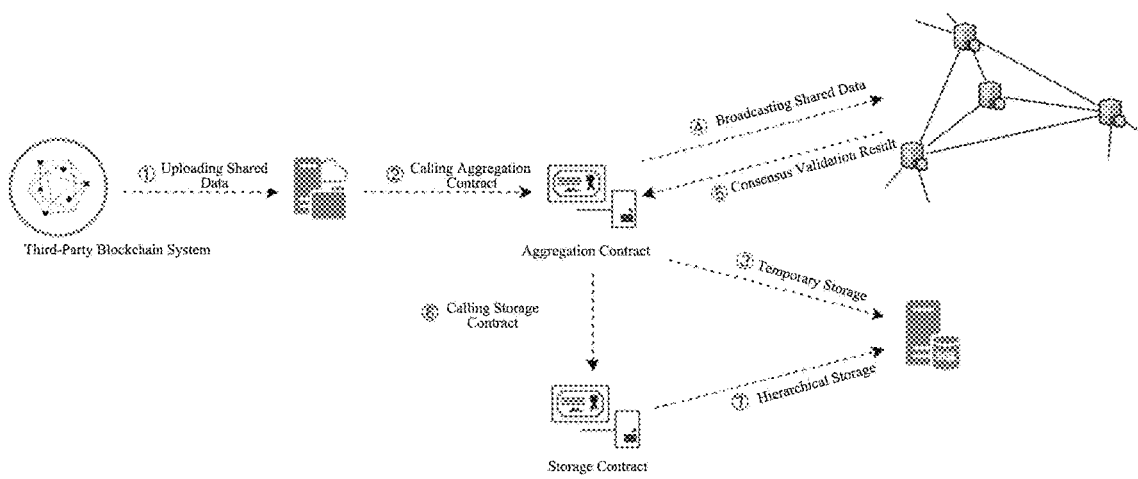
FIG. 3 is a schematic flowchart showing that the third-party blockchain system uploads shared data to the data-sharing blockchain system as disclosed in the present invention, and performs data aggregation and hierarchical storage.

Preferably, as shown in FIG. 3, a third-party blockchain system that has accessed the data-sharing chain may upload shared data to the data-sharing chain. According to the fourth contract in the third-party blockchain system, the shared data generated in the third-party blockchain system are packaged and then sent to the data-sharing chain. With deployment of the fourth contract, or the uploading contract, the third-party blockchain system can upload its local shareable data to the data-sharing blockchain system.

The data-sharing blockchain system is deployed with a second contract for processing data submission. It is used to process shared data submitted by third-party blockchain systems. With deployment of the aggregation contract, or the second contract, the system can store data coming from heterogeneous systems uniformly, thereby effectively realizing abstract uniformness of the shared data.

After receiving the message, the data-sharing chain broadcasts the message and performs consensus validation. After successful consensus validation, the data-sharing chain calls the fifth contract to hierarchically storing the data according to the sharing and storing hierarchy recorded in the block for later retrieval. With deployment of the fifth contract, or the storage contract, third-party blockchain system can perform hierarchical storage according to its own data sharing hierarchy, thereby realizing isolated data storage among different sharing levels.

To achieve multi-blockchain data sharing in a hierarchical manner, the disclosed data sharing process may comprise the following steps.

Figure 4:
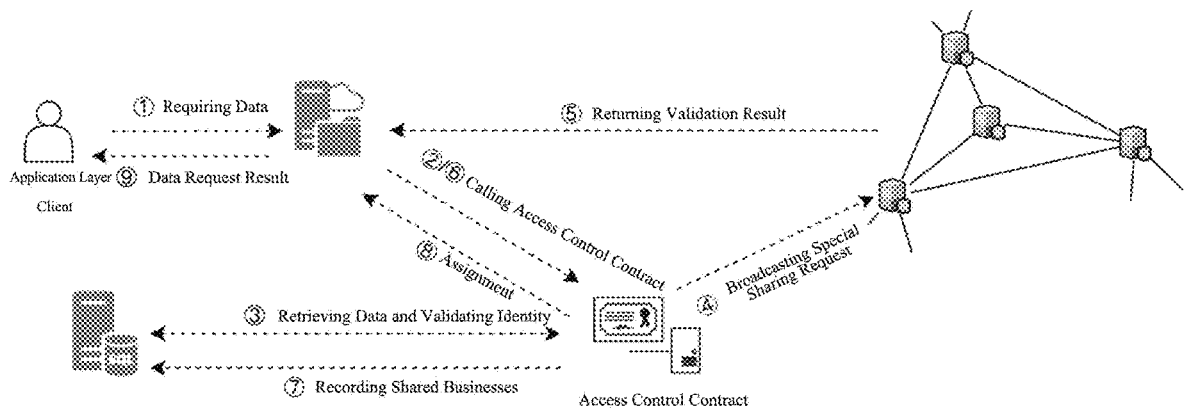
FIG. 4 is a s schematic flowchart showing that an application-layer client makes a request for the shared data to the data-sharing blockchain system according to the present invention.

As shown in FIG. 4, the application-layer client sends the data request to the data-sharing chain. The data-sharing chain after receiving the data request performs data retrieval.

The data-sharing chain calls the sixth contract. The sixth contract validates whether the identity of the requester making the data request matches the sharing hierarchy of the data request sent by the requester. With deployment of the sixth contract, or the access control contract, privacy protection for data of different levels of the sharing hierarchy in the third-party blockchain system can be achieved. The sixth contract will validate that whether the data request needs to be recorded into the system log. Sensitive or crucial data are often assigned with special levels of the sharing and storing hierarchy to limit their sharing transactions. Sharing of these data has to reach consensus across the whole blockchain system and be recorded. Through data retrieval, the data-sharing chain can get data retrieval results meeting the access requirements. The data-sharing chain packages the data in the data retrieval result. The package contains data contents obtained through retrieval and the Merkle tree route of the block where the data are stored.

After completing retrieval of the shared data and access assignment, the data-sharing chain returns the packaged data as a data-requiring result to the application-layer client.

After receiving the data-requiring result, the application-layer client can validate reliability of the received data according to the Merkle tree root in the local block head and validation information in the data.

To sum up, the present invention provides a highly flexible, scalable multi-blockchain, hierarchical data-sharing and data-storing system, which reduce complexity of data sharing in multi-blockchain scenarios and storage overheads of application-layer clients, thereby providing a custom, scalable fine-grained access control method.

It should be noted that the above-mentioned specific embodiments are exemplary, and those skilled in the art can come up with various solutions inspired by the disclosure of the present invention, and those solutions also fall within the disclosure scope as well as the protection scope of the present invention. It should be understood by those skilled in the art that the description of the present invention and the accompanying drawings are illustrative rather than limiting to the claims. The protection scope of the present invention is defined by the claims and their equivalents. The description of the present invention contains a number of inventive concepts, such as "preferably", "according to a preferred embodiment" or "optionally" all indicate that the corresponding paragraph discloses an independent idea, and the applicant reserves the right to file a divisional application based on each of the inventive concepts.

What is claimed is:

1. A data-sharing method based on blockchain smart contracts, wherein the method at least comprises:
    having a third-party blockchain system, when accessing a data-sharing blockchain system, preset data sharing rules in the data-sharing blockchain system;
    assigning corresponding sharing rules to every entry of shared data during uploading of the shared data; and
    having the data-sharing blockchain system perform data storage and/or data access control according to the data sharing rules;
    deploying a first contract in the data-sharing blockchain system for processing access requests from third-party blockchain systems;
    deploying a second contract in the data-sharing blockchain system for processing shared data submitted by third-party blockchain systems;
    deploying a third contract in the data-sharing blockchain system for submitting access requests so as to establish connection between the third-party blockchain systems and the data-sharing blockchain system;
    deploying a fourth contract in the third-party blockchain systems for uploading shared data, so that the third-party blockchain system can send the shared data to the data-sharing blockchain system;
    deploying a fifth contract to perform hierarchical storage on the shared data according to the sharing and storing hierarchy; and
    deploying a sixth contract to retrieve data in response to a client request that requires the shared data, and performs access control according to the data storing and sharing hierarchy.

* * * * *